United States Patent
Akage et al.

(10) Patent No.: US 12,085,832 B2
(45) Date of Patent: Sep. 10, 2024

(54) OPTICAL DEFLECTION DEVICE

(71) Applicant: Nippon Telegraph and Telephone Corporation, Tokyo (JP)

(72) Inventors: Yuichi Akage, Tokyo (JP); Takashi Sakamoto, Tokyo (JP); Soichi Oka, Tokyo (JP); Sohan Kawamura, Tokyo (JP); Masahiro Ueno, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 365 days.

(21) Appl. No.: 17/609,221

(22) PCT Filed: May 29, 2019

(86) PCT No.: PCT/JP2019/021214
§ 371 (c)(1),
(2) Date: Nov. 5, 2021

(87) PCT Pub. No.: WO2020/240726
PCT Pub. Date: Dec. 3, 2020

(65) Prior Publication Data
US 2022/0214594 A1    Jul. 7, 2022

(51) Int. Cl.
G02F 1/29    (2006.01)
G02F 1/03    (2006.01)

(52) U.S. Cl.
CPC .............. G02F 1/29 (2013.01); G02F 1/0322 (2013.01); G02F 1/0311 (2013.01)

(58) Field of Classification Search
CPC ......... G02F 1/29; G02F 1/0322; G02F 1/0311
See application file for complete search history.

(56) References Cited

U.S. PATENT DOCUMENTS

2017/0358899 A1* 12/2017 Toyoda ................... H01S 5/143

FOREIGN PATENT DOCUMENTS

| JP | 2008185891 A | 8/2008 |
| JP | 2015141274 A | 8/2015 |
| JP | 2018069310 A | 5/2018 |

OTHER PUBLICATIONS

Boyd, Robert W., "Nonlinear Optics Second Edition", Academic Press, p. 519, Fig. 12.3.1, 1995, 2 pages.
(Continued)

*Primary Examiner* — Joseph P Martinez
(74) *Attorney, Agent, or Firm* — SLATER MATSIL, LLP

(57) ABSTRACT

In an embodiment, an optical deflection device includes: an electro-optic crystal comprising $KTa_{1-x}Nb_xO_3$, the electro-optic crystal having a first surface and a second surface, the first surface and the second surface facing each other; a first electrode on the first surface of the electro-optic crystal; a second electrode on the second surface of the electro-optic crystal; a power source configured to output a control voltage for forming an electric field inside the electro-optic crystal via the first electrode and the second electrode; and a light source configured to emit a pulse laser to be incident on the electro-optic crystal along an optical axis, the optical axis substantially perpendicular to a direction of the electric field formed by the control voltage, wherein a peak power density of the pulse laser output from the light source at a light incidence surface of the electro-optic crystal is less than 800000 W/cm².

13 Claims, 4 Drawing Sheets

(56) References Cited

OTHER PUBLICATIONS

Datalogic S. p. A., "Datalogic's 'Multiwave' series MW-10M & MW-20M MOPA Pulsed Fiber Lasers—Optimized for Laser Marking at 1064 nm", Datalogic, Multiwave—M Series, http://www.hidroair.com.br/pdf/DS-MOPA_M-ENA4.pdf, Jun. 2014, 2 pages.
"Application areas of optical deflectors and technical information (Application and technical information of optical deflectors)", Fiber Optics Standardization Meeting Administrative Advisory Submeeting, issued by Optoelectronics Industry and Technology Development Association (JAPAN), First edition, Mar. 2017, 46 pages.
Imai, T et al., "Performance of varifocal lenses using $KTA1_xNb_xO_3$ crystals with response times faster than 2 μs", Electronics Letters, vol. 49, No. 23, Nov. 7, 2013, pp. 1470-1471.

\* cited by examiner

OPTICAL DEFLECTION DEVICE

CROSS-REFERENCE TO RELATED APPLICATION

This application is a national phase entry of PCT Application No. PCT/JP2019/021214, filed on May 29, 2019, which application is hereby incorporated herein by reference.

TECHNICAL FIELD

The present disclosure relates to an optical deflection device using an electro-optic crystal formed of $KTa_{1-x}Nb_xO_3$.

BACKGROUND

A beam scanner (optical deflection device) represented by those such as a galvano scanner for scanning a light beam irradiation position is conventionally configured in such a manner that a mirror is mounted on a component such as a motor that is mechanically driven. In this type of beam scanner, the beam scanning is limited by operation speed of components such as a motor, and an operation speed of several kilohertz to several tens of kilohertz at most is typically an upper limit of the operation speed.

In recent years, in place of the beam scanner with the mechanical operation as described above, a beam scanner that is constituted of a $KTa_{1-x}Nb_xO_3$ (KTN) crystal and implements beam scanning by voltage control has drawn attention. Research and development of this beam scanner has been actively carried out because the stated beam scanner includes no mechanical control component, allows the operation speed to increase up to the speed of megahertz, is small in size, allows the optical design to be simplified since it is a transparent device, and the like.

The KTN crystal has a feature that the Kerr effect, which is a secondary electro-optic (EO) effect, is larger than that of other electro-optic crystal materials, and is expected to be applied as a beam scanner due to its relatively large deflection characteristics among the electro-optic crystal materials. A KTN optical module for utilizing KTN as a beam scanner includes an KTN crystal formed in a rectangular shape, and a pair of electrodes formed on each of surfaces facing each other of the KTN crystal. The KTN optical module is fixed on a heat sink with a Peltier element interposed therebetween.

In the KTN optical module, a light beam enters along an optical axis substantially perpendicular to a direction of an electric field that is formed inside the KTN crystal by a control voltage applied by the pair of electrodes. The traveling direction of the light beam having been incident on the KTN crystal is changed by the electric field applied thereto to a direction in which the electric field is being applied. Thus, an optical deflection device using the above KTN optical module can perform scanning with the light beam by the control voltage, in the application direction of the electric field.

CITATION LIST

Non-Patent Literature

NPL 1: "Application and technical information of optical deflectors", Fiber Optics Standardization Meeting Administrative Advisory Submeeting, issued by Optoelectronics Industry and Technology Development Association (JAPAN), First edition, 2017.

NPL 2: R. W. Boyd, "Nonlinear Optics Second Edition", Academic Press, p. 519, FIG. 12.3.1, 1995.

SUMMARY

Technical Problem

As described above, the research and development of the optical deflection device has been actively carried out, but there exists a limit to laser power that can be input to this type of optical deflection device, and thus the control of the laser power and a beam shape is considered to be important. For example, in a galvano scanner, an absorption ratio, a beam diameter, power, and the like of an incident laser at a galvano mirror determine a limit value of the laser power allowed to enter, that is, determine a range of the laser power that will not damage or deform the mirror due to heat generated at a location on which the laser is incident. In a case of a pulse laser, the design is made to prevent a system failure by controlling the laser power in such a manner as to prevent a situation in which the mirror surface is damaged because of the mirror being unable to follow a change corresponding to the pulse width. Since the increase of the size of the mirror described above increases the rigidity of the mirror material, a load applied to the motor, and the like, it is generally known that the mirror size and the operation speed of the galvano scanner have a trade-off relationship, and the development of an optical deflector to replace the galvano scanner is required.

It is known that, in materials such as quartz glass, in general, not only the average power of the pulse laser, but also the resistance against the pulse laser changes depending on the time width of the pulse (NPL 2), and a picosecond pulse rather than a nanosecond pulse and a femtosecond pulse rather than the picosecond pulse can allow a pulse with a higher spire value to enter. It is also known that, in a case where a laser antireflection film is provided on a surface of quartz glass or the like, laser resistance changes in accordance with the formation conditions of the antireflection film, so that it is a basic requirement to control a safe laser power level taking into account a manufacturing error of the antireflection film.

In the case where the KTN crystal is used for an optical deflection device, it is also essential to control the laser power, similarly to the conventional optical deflection device, optical materials, and the like; particularly, in the applications combined with a high power laser, the controlling of the laser power is a specially important issue from the viewpoint of safety, stability, and the like. However, light resistance when a short light pulse with high peak power is incident on a KTN crystal has not been sufficiently studied, and there has been no indicator for the resistance of the crystal against the laser pulse.

The present disclosure has been conceived to solve the problems described above, and an object thereof is to prevent a KTN crystal from being damaged by the incidence of a laser.

Means for Solving the Problem

An optical deflection device according to the present disclosure includes an electro-optic crystal formed of $KTa_{1-x}Nb_xO_3$, a single pair of electrodes, a first electrode of the single pair of electrodes formed on a first surface of the electro-optic crystal, a second electrode of the single pair of electrodes formed on a second surface of the electro-optic crystal, the first surface and the second surface facing each other, a power source configured to output a control voltage for forming an electric field inside the electro-optic crystal via the single pair of electrodes, and a light source configured to emit a pulse laser to be incident on the electro-optic crystal along an optical axis substantially perpendicular to a direction of the electric field formed by the control voltage, where a peak power density of the pulse laser output from the light source at a light incidence surface of the electro-optic crystal is less than 800000 W/cm$^2$.

In one configuration example of the above-described optical deflection device, a center wavelength of the pulse laser is in a range from 1060 nm to 1070 nm.

In one configuration example of the above-described optical deflection device, a pulse width of the pulse laser is any of widths in a range from 50 ns to 180 ns.

In one configuration example of the above-described optical deflection device, a beam of the pulse laser is shaped to be flat in a direction perpendicular to the direction of the electric field formed by the control voltage in a cross-sectional view.

Effects of the Invention

As described above, according to the present disclosure, since the peak power density of the pulse laser output from the light source at the light incidence surface of the electro-optic crystal formed of KTN is made smaller than 800000 W/cm$^2$, it is possible to prevent the KTN crystal from being damaged by the incidence of the laser.

DESCRIPTION OF EMBODIMENTS

Figure 1:
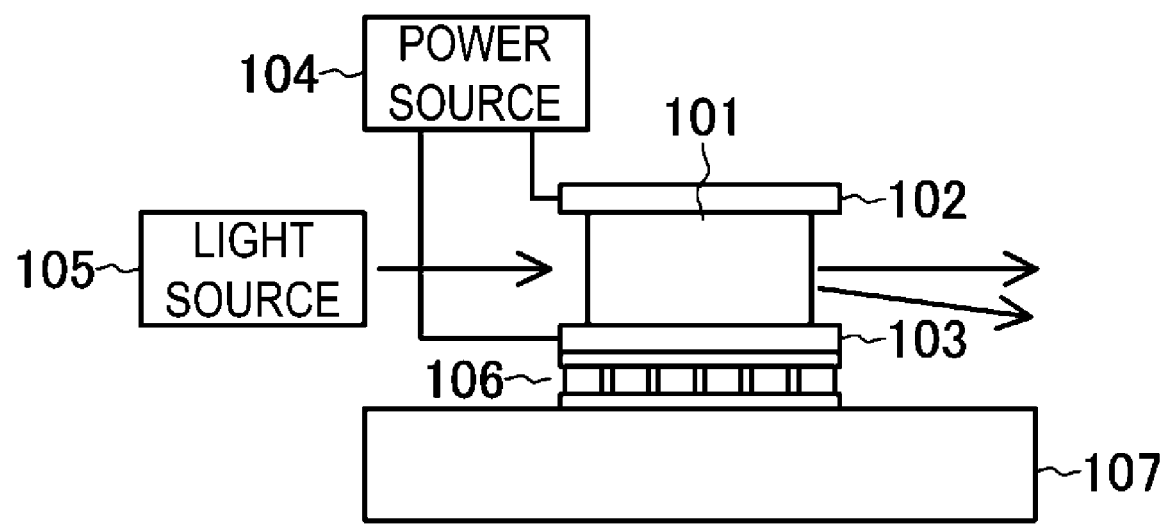
FIG. 1 is a configuration diagram illustrating a configuration of an optical deflection device according to an embodiment of the present disclosure.

Hereinafter, an optical deflection device according to an embodiment of the present disclosure will be described with reference to FIG. 1. First, the optical deflection device includes an electro-optic crystal 101 formed of potassium tantalate niobate (KTa$_{1-x}$Nb$_x$O$_3$) (KTN), and a pair of a first electrode 102 and a second electrode 103 formed on each of surfaces facing each other of the electro-optic crystal 101. The optical deflection device further includes a power source 104 configured to output a control voltage for forming an electric field inside the electro-optic crystal 101 via the pair of the first electrode 102 and the second electrode 103.

Further, the optical deflection device includes a light source 105 configured to emit a pulse laser to be incident on the electro-optic crystal 101 along an optical axis substantially perpendicular to a direction of the electric field formed by the control voltage. The peak power density of the pulse laser output from the light source 105 at a light incidence surface (or light outgoing surface) of the electro-optic crystal 101 is less than 0.8 MW/cm$^2$ (800000 W/cm$^2$).

The optical deflection device according to the present embodiment includes a Peltier element 106 and a heat sink 107. The Peltier element 106 is fixed on the heat sink 107. A module configured of the electro-optic crystal 101, the first electrode 102, and the second electrode 103 is fixed on the Peltier element 106 and is allowed to be cooled.

The center wavelength of the pulse laser emitted by the light source 105 is in a range from 1060 nm to 1070 nm. The pulse width of the pulse laser emitted by the light source 105 is any of the widths in a range from 50 ns to 180 ns. The beam of the pulse laser emitted by the light source 105 is shaped to be flat in a direction perpendicular to the direction of the electric field formed by the control voltage applied by the first electrode 102 and the second electrode 103 in a cross-sectional view.

With the optical deflection device according to the present embodiment, since the peak power density of the pulse laser output from the light source 105 at the light incidence surface of the electro-optic crystal 101 is made smaller than 0.8 MW/cm$^2$, it is possible to prevent the electro-optic crystal 101 from being damaged by the incidence of the pulse laser.

Figure 2:
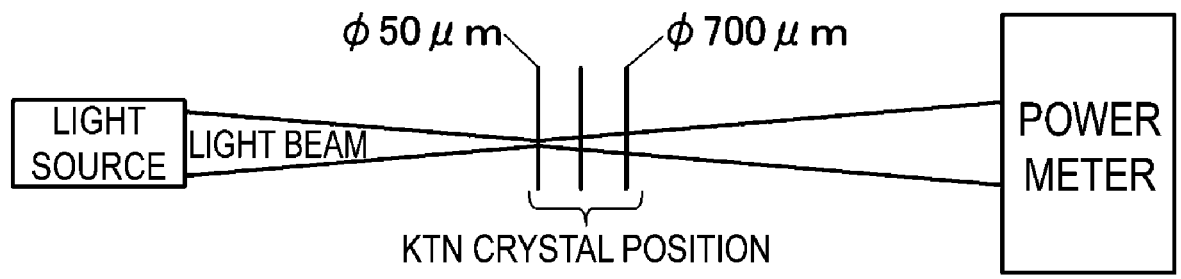
FIG. 2 is an explanatory diagram for describing an examination system configured to perform resistance examination in which a KTN element fails.

Hereinafter, a result of an investigation of laser light resistance of a KTN crystal will be described. In the investigation, for the sake of simplicity, a resistance examination was carried out in which a KTN element failed while causing the laser output to be constant and taking a spot diameter of the incident pulse laser as a parameter. FIG. 2 illustrates a system for the examination that was carried out. In order to cause the pulse laser from the light source to be accurately incident on a light incidence surface [3.2 mm×1.2 mm (t)] of the KTN crystal, the experiment was carried out while observing an incident end surface of the pulse laser with a camera disposed on the optical axis. The beam diameter of the pulse laser corresponding to a distance from an end surface of a lens, constituting the light source, for focusing the pulse laser was measured in advance, and the experiment was carried out while adjusting the beam diameter of the light beam to be incident on the KTN crystal by the distance between the light source and the KTN crystal. The pulse laser was set to have a pulse width of 50 ns, a maximum output of 30 W, a pulse repetition frequency of 30 to 80 kHz, and was in a single-transverse mode.

Figure 3:
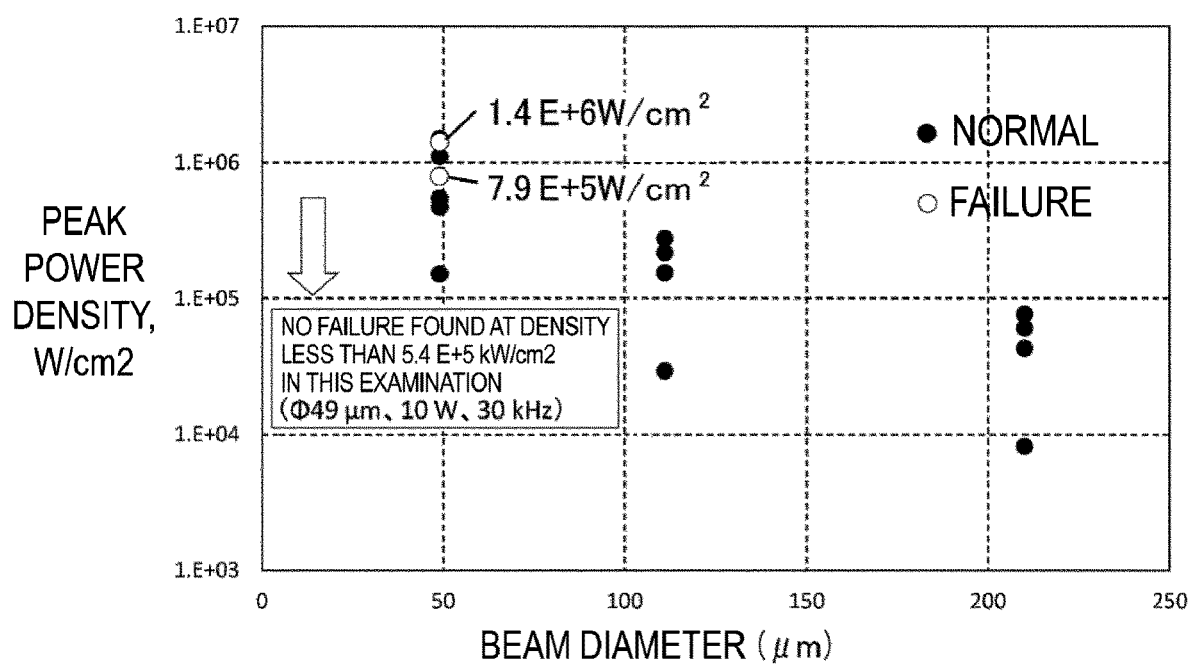
FIG. 3 is a characteristic diagram illustrating a result of an investigation of laser light resistance of a KTN crystal.

The result of the investigation is illustrated in FIG. 3. As illustrated in FIG. 3, it was found that the KTN crystal failed when the peak power density of the light beam, which was the pulse laser, was equal to or greater than approximately 0.8 MW/cm$^2$. Further, the occurrence of failures was reproduced and confirmed at the same level in several KTN crystals. The pulse laser used as the light source in this investigation had an oscillation frequency of 30 kHz to 80 kHz and a pulse width of 50 ns. An experiment similar to that described above was carried out in which the time width of a pulse of the pulse laser was set to be 180 ns; as a result, it was confirmed that the KTN crystals failed at an equivalent level of power density.

From these investigation results, in order to stably utilize a KTN crystal with respect to a pulse laser of high output, an indicator was confirmed for utilizing the KTN crystal safely and stably in combination with a pulse laser while suppressing damage to the KTN crystal by controlling the peak power density. These results revealed that it was desirable to control a pulse laser to be incident on an electro-optic crystal formed of KTN to have a peak power density of not greater than approximately 0.8 MW/cm$^2$.

With the above-mentioned indicator, for example, in a case where the power of the pulse laser is desired to be higher, it is conceivable to reduce the power density by causing the cross-sectional shape of the pulse laser beam incident on the KTN crystal to be widened into a flat shape in a direction perpendicular to the direction of the applied electric field, for example. In the case where the power of the pulse laser is desired to be higher, such a design guideline has been clarified that the pulse laser is controlled to have a beam shape with little variance in light intensity of the spatial beam within a possible range, or the like. As described above, widening the cross-sectional shape of the beam in a direction perpendicular to the direction of the applied electric field is considered to be advantageous for facilitating the temperature control of the KTN crystal, optimizing the deflection characteristic control thereof, and the like.

Figure 4:
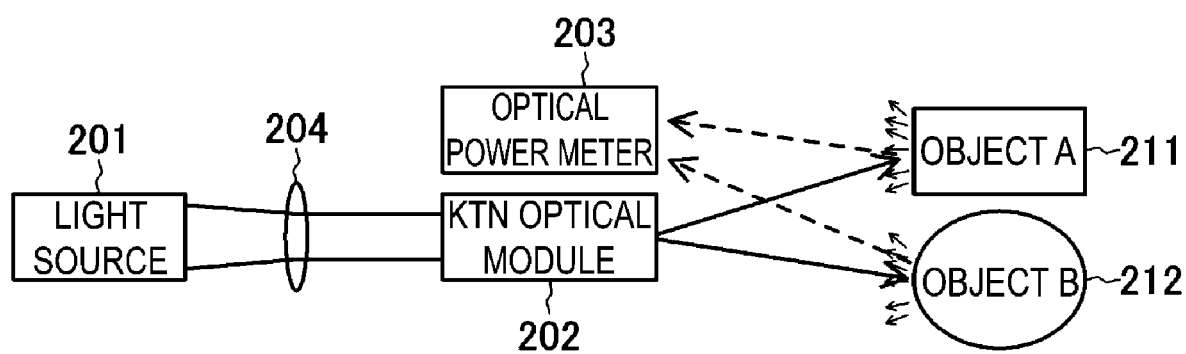
FIG. 4 is a configuration diagram illustrating a configuration of a distance measurement system using an optical deflection device according to the present embodiment.

Hereinafter, an example of a distance measurement system using the optical deflection device according to the present embodiment will be described with reference to FIG. 4. The distance measurement system includes a light source 201, a KTN optical module 202, and an optical power meter 203. The KTN optical module 202 includes a KTN crystal, a pair of electrodes formed on each of surfaces facing each other of the KTN crystal, and a power source configured to output a control voltage for forming an electric field in the KTN crystal via the pair of electrodes. The KTN optical module 202 includes a temperature control mechanism such as a Peltier element. The temperature control mechanism controls the temperature of the KTN crystal to be equal to or higher than a temperature at which the KTN stably operates as a cubic crystal and also to be a temperature that brings a dielectric constant with which sufficient deflection characteristics can be maintained.

The light source 201 emits a single mode pulse laser with a center wavelength of 1070 nm in a range from 30 kHz to 80 kHz. The time (pulse) width of the pulse laser is about 50 ns. A light beam emitted from the light source 201 passes through a collimator lens 204 to be incident on the KTN crystal of the KTN optical module 202. To measure a distance to an outdoor distance measurement target, the light source 201 sets the output of the emitted pulse laser as high as possible to be 30 W in order to make it possible to detect returning scattering light from the distance measurement target with good sensitivity.

The light incidence surface of the KTN crystal has a size of 3.2 mm×1.2 mm (t), and the length from the light incidence surface to the light outgoing surface (thickness of the KTN crystal) is 4.0 mm. A pair of electrodes is disposed to sandwich surfaces of the KTN crystal spaced apart by 1.2 mm (t). Further, the optical system is adjusted so that the laser is incident on the center of the light incidence surface of the KTN crystal.

By using the collimator lens 204 and an optical system such as a prism (not illustrated), the light intensity (peak power density) of the beam at the KTN crystal surface is made to be 0.3 MW/cm². The cross-sectional shape of the light beam emitted from the light source 201 is made flat in a direction perpendicular to the direction of the electric field applied to the KTN crystal by using the prism, thereby obtaining the light intensity described above. Note that in this example, to prevent adhesion of dust or the like from the outside, the entire system configured of the light source 201, the KTN optical module 202, and the optical power meter 203 was covered with a case, and the environmental atmosphere was adjusted so that the inside of the case was under a positive pressure; then, the following distance measurement experiment was carried out.

Next, the result of the distance measurement experiment using the above-discussed distance measurement system will be described below. The distance measurement experiment to measure distances from the distance measurement system to an object A 211 and an object B 212 was carried out 50 times over approximately eight hours. In this experiment, the temperature of the KTN crystal of the KTN optical module 202 was stable and no failure occurred. The same experiment was carried out the next day, and the stability of the operation was confirmed. From these experimental results, it has been confirmed that the optical deflection device according to the present embodiment can be stably used in combination with a light source by a high power laser without damaging the KTN crystal.

Note that in the above description, the pulse laser emitted from the light source is incident on the electro-optic crystal along an optical axis substantially perpendicular to the direction of the electric field formed by the control voltage, but the direction of incidence is not required to be along an optical axis that is completely perpendicular to the direction of the electric field. For example, the optical axis of the pulse laser to be incident on the electro-optic crystal may be adjusted to be shifted from the normal direction of the electro-optic crystal surface (the optical axis substantially perpendicular to the direction of the electric field) in order to prevent returning reflection light from returning along the same optical axis direction. By the above-described adjustment, it is possible to prevent a situation in which a laser device to serve as the light source, optical components, and the like are damaged by returning laser light from the light incidence surface of the electro-optic crystal.

As described above, according to the present disclosure, since the peak power density of the pulse laser output from the light source at the light incidence surface of the electro-optic crystal formed of KTN is made smaller than 800000 W/cm², it is possible to prevent the KTN crystal from being damaged by the incidence of the laser.

The present disclosure is not limited to the embodiments described above, and it should be appreciated that many modifications and combinations can be implemented within the technical spirit of the present disclosure.

REFERENCE SIGNS LIST

101 Electro-optic crystal
102 First electrode
103 Second electrode
104 Power source
105 Light source
106 Peltier element
107 Heat sink

The invention claimed is:

1. An optical deflection device comprising:
an electro-optic crystal comprising $KTa_{1-x}Nb_xO_3$, the electro-optic crystal having a first surface and a second surface, the first surface and the second surface facing each other;
a first electrode on the first surface of the electro-optic crystal;
a second electrode on the second surface of the electro-optic crystal;
a power source configured to output a control voltage for forming an electric field inside the electro-optic crystal via the first electrode and the second electrode; and a light source configured to emit a pulse laser to be incident on the electro-optic crystal along an optical axis, the optical axis substantially perpendicular to a direction of the electric field formed by the control voltage, wherein a peak power density of the pulse laser output from the light source at a light incidence surface of the electro-optic crystal is less than 800000 W/cm².

2. The optical deflection device of claim 1, wherein a center wavelength of the pulse laser is in a range from 1060 nm to 1070 nm.

3. The optical deflection device of claim 1, wherein a pulse width of the pulse laser is in a range from 50 ns to 180 ns.

4. The optical deflection device of claim 1, wherein a beam of the pulse laser is shaped to be flat in a direction perpendicular to the direction of the electric field formed by the control voltage in a cross-sectional view.

5. The optical deflection device of claim 1 further comprising:
a Peltier element on the second electrode; and
a heat sink on the Peltier element.

6. An optical deflection device comprising:
an electro-optic crystal comprising $KTa_{1-x}Nb_xO_3$;
a power source configured to form an electric field inside the electro-optic crystal; and
a light source configured to emit a laser beam to be incident on a light incidence surface of the electro-optic crystal along an optical axis, the optical axis being perpendicular to a direction of the electric field inside the electro-optic crystal, wherein a peak power density of the laser beam at the light incidence surface of the electro-optic crystal is less than 800000 W/cm², and wherein the laser beam is flat in a direction perpendicular to the direction of the electric field inside the electro-optic crystal.

7. The optical deflection device of claim 6 further comprising:
a Peltier element on the electro-optic crystal, the Peltier element configured to control a temperature of the electro-optic crystal to be equal to or higher than a temperature at which $KTa_{1-x}Nb_xO_3$ operates as a cubic crystal.

8. The optical deflection device of claim 6, wherein a center wavelength of the laser beam is in a range from 1060 nm to 1070 nm.

9. The optical deflection device of claim 6, wherein a pulse width of the laser beam is in a range from 50 ns to 180 ns.

10. An optical deflection method comprising:
forming an electric field inside an electro-optic crystal, the electro-optic crystal comprising $KTa_{1-x}Nb_xO_3$; and
emitting a laser beam to be incident on a light incidence surface of the electro-optic crystal along an optical axis, the optical axis being perpendicular to a direction of the electric field inside the electro-optic crystal, wherein a peak power density of the laser beam at the light incidence surface of the electro-optic crystal is less than 800000 W/cm², and wherein the laser beam is flat in a direction perpendicular to the direction of the electric field inside the electro-optic crystal.

11. The optical deflection method of claim 10 further comprising:
controlling a temperature of the electro-optic crystal to be equal to or higher than a temperature at which $KTa_{1-x}Nb_xO_3$ operates as a cubic crystal.

12. The optical deflection method of claim 10, wherein a center wavelength of the laser beam is in a range from 1060 nm to 1070 nm.

13. The optical deflection method of claim 10, wherein a pulse width of the laser beam is in a range from 50 ns to 180 ns.

* * * * *